US006490328B1

(12) United States Patent
Wu

(10) Patent No.: US 6,490,328 B1
(45) Date of Patent: Dec. 3, 2002

(54) HIGH SPEED DATA TRANSCEIVER IN HARSH WIRING NETWORKS

(75) Inventor: Qiang Wu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/309,534

(22) Filed: May 11, 1999

(51) Int. Cl.[7] .................................................. H04L 1/00
(52) U.S. Cl. ........................ 375/346; 375/219; 375/232
(58) Field of Search ................................ 375/219, 223, 375/229, 230, 232, 233, 285, 295, 296, 340, 345, 346, 377, 316; 340/310.01, 310.03, 310.06; 455/63, 73, 501

(56) References Cited

U.S. PATENT DOCUMENTS 4,425,665 A * 1/1984 Stauffer ...................... 375/223
5,838,738 A * 11/1998 Zook ........................... 375/340
6,125,154 A * 9/2000 Sutardja ...................... 375/345
6,289,063 B1 * 9/2001 Duxbury ...................... 375/348

* cited by examiner

*Primary Examiner*—Stephen Chin
*Assistant Examiner*—Chieh M. Fan
(74) *Attorney, Agent, or Firm*—Schwegman, Lundberg, Woessner & Kluth, P.A.

(57) ABSTRACT

A digital signal communication system is described which can operate in harsh wiring networks. The signal processor includes a transmitter circuit and a receiver circuit for transmitting and receiving data signals over noisy wiring networks, such as household AC power networks. The receiver circuit uses a digital signal detector which detects a signal arrive time and a phase of a detected signal, and normalizes an amplitude of the receive signal. The receiver circuit also uses a digital channel equalizer with an auto step selection and a coefficient-relaxing scheme for convergence in harsh wiring environments.

18 Claims, 4 Drawing Sheets

HIGH SPEED DATA TRANSCEIVER IN HARSH WIRING NETWORKS

TECHNICAL FIELD OF THE INVENTION

The present invention relates generally to transceiver circuits and in particular the present invention relates to transceiver circuits that can operate in harsh wiring networks.

BACKGROUND OF THE INVENTION

A data network is a system that permits individual devices to exchange data with one or more other devices. Data network systems encompass computer networks including a number of computers, printers, or other peripheral equipment linked together. Data networks also include communication with automated control and monitoring equipment, telemetry devices, alarm devices, or the like. Historically the devices of a network have been linked together by dedicated wiring. Dedicated wiring, however, has a number of recognized limitations and drawbacks, including the high cost, delay, inconvenience and in some circumstances complexities of installation in existing buildings, and once installed, the cost and inconvenience of expanding or reconfiguring the system. Alternative approaches have emerged using wireless radio-frequency, infrared transmissions or using the AC power lines as the network communications medium.

In power line data communications the transmitted data is piggybacked onto an existing power line in addition to the electrical AC line current already present for delivering electrical power. Using the power line as the medium for communications is particularly convenient because a power line will always be present to provide power to the various nodes of the network, and this avoids the need to retrofit the work area with dedicated wiring. The power line, however, presents an extremely hostile electrical environment. The transmission of data over interconnecting wires suffers from several noise and attenuation phenomena. Specifically, when an AC power line is used as the transmission medium, this type of system generally exhibits unpredictable transmission characteristics such as extreme attenuation at certain frequencies, phase changes along the transmission route, and notches and discontinuities. The power line characteristics may vary significantly as load conditions on the line vary, e.g., a variety of other loads being added or removed from the current-carrying line. Such loads include industrial machines, the various electrical motors of numerous appliances, light dimmer circuits, heaters and battery chargers. To provide communication on such noisy lines, transceiver circuits can be provided which include complicated synchronization and timing recovery circuitry.

Data communication speeds over power lines are currently limited to approximately 100 to 400 Kbps. For the reasons stated above, and for other reasons stated below which will become apparent to those skilled in the art upon reading and understanding the present specification, there is a need in the art for a high-speed data transmitter and receiver for communicating over household type power lines and telephone circuits.

SUMMARY OF THE INVENTION

In one embodiment, a receiver circuit comprises an external coupling circuit for receiving an analog input signal, an amplifier circuit for amplifying the analog input signal, and an analog filter having an input connection to receive the analog input signal which comprises a data signal and noise signals. The analog filter removes some out-of-band noise from the analog input signal and provides an analog output signal. The receiver circuit further comprises an analog to digital circuit coupled to an output connection of the analog filter to convert the analog output signal to a digital signal, and a signal detector coupled to the analog to digital circuit. The signal detector detects an arrive time of the data signal, and normalizes an output signal from the signal detector based upon a detected maximum amplitude. An equalizer circuit is provided which comprises a recursive filter using variable weight functions which are controlled by a calculated error signal.

In another embodiment, a transceiver circuit comprises a receiver circuit and a transmitter circuit. The receiver circuit comprises an analog filter having an input connection to receive an analog input signal which comprises a data signal and noise signals, an analog to digital circuit coupled to an output connection of the analog filter to convert the analog output signal to a digital signal, a signal detector coupled to the analog to digital circuit, and an equalizer circuit comprising a recursive filter using variable weight functions which are controlled by a calculated error signal. The transmitter circuit comprises a pulse generator circuit, and a spectral shaping filter.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

A robust, simplified, high-speed data transceiver is described herein. The transceiver can communicate over household wiring systems, such as power lines and telephone lines, at speeds which exceed 10 Mbps. In particular, one embodiment described has been tested at speeds in excess of 15 Mbps including communication at 15.625 Mbps through power lines in residential homes. The transceiver includes a digital signal detector circuit and a channel equalizer which allow the transceiver to operate in such harsh conditions. The transceiver is designed, in one embodiment, to transmitted in a frequency range from 2 to 30 MHZ to comply with federal communications requirements. While the communications system is designed to operate using household power wiring, or telephone wires, the present invention can be used to communicate over any noisy wiring system is not limited to household use. In particular, the present invention can be used in businesses and factories.

Figure 1:
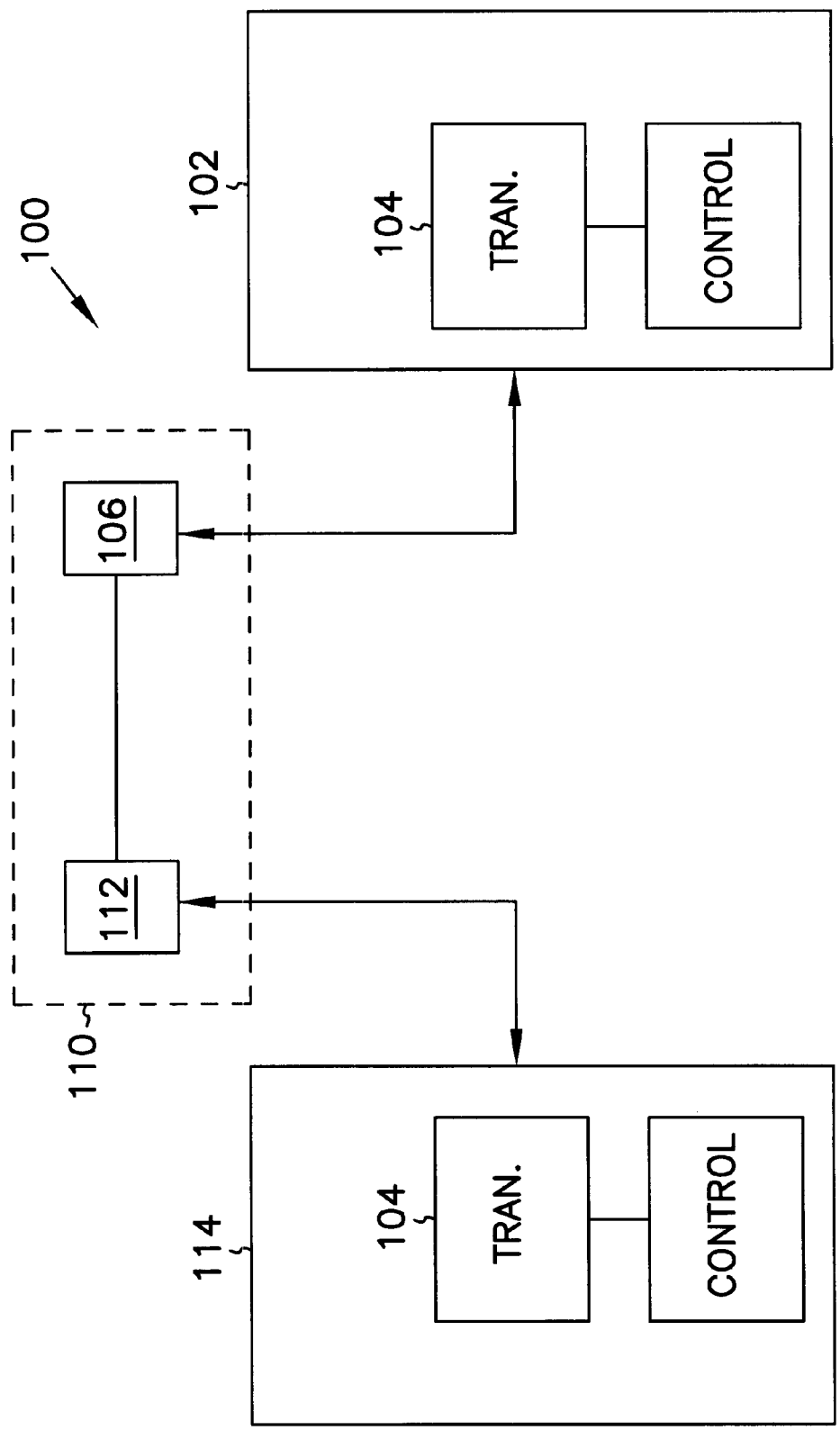
FIG. 1 is a block diagram of a communications system of one embodiment of the present invention.

Referring to FIG. 1, a block diagram of a communications system 100 of one embodiment of the present invention is illustrated. The system includes a first device 102 which includes a first transceiver 104. The transceiver is connected to a first node 106 of a wiring system 110. Connected to a second node 112, is a second transceiver 104 of a second device 114. First and second devices, 102 and 114, respectively, can be any type of processing device such as a computer processor, or peripheral devices. For example, both the first and the second devices 102, and 114, respectively, can be computer processors located remotely from each other and connected for communication over wiring system 110.

Figure 2:
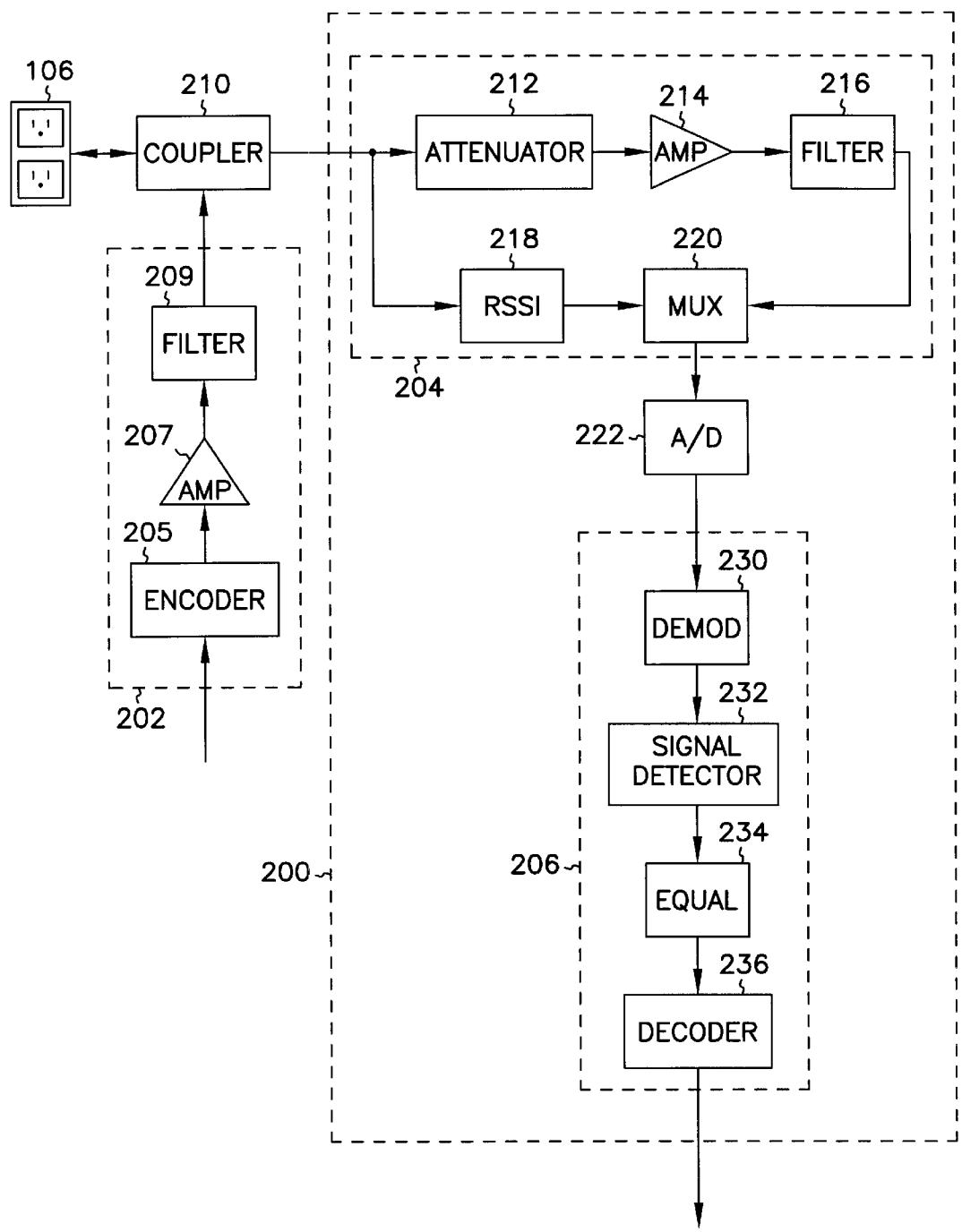
FIG. 2 illustrates a high-level block diagram of a transceiver of one embodiment of the present invention.
Figure 3:
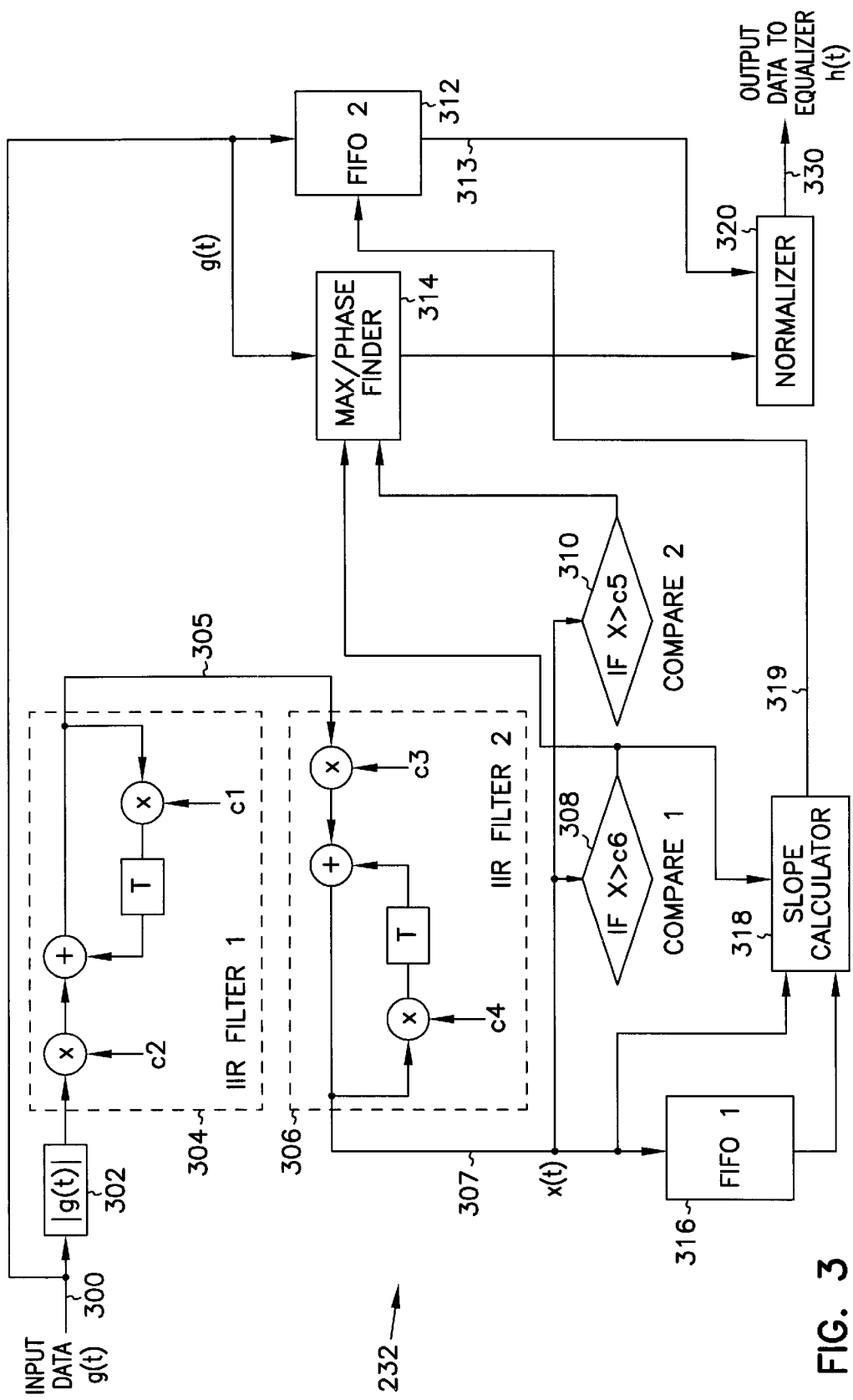
FIG. 3 is a diagram of a signal detector circuit transceiver of one embodiment of the present invention.

A more detailed description of one embodiment of the first transceiver 104 is described with reference to FIGS. 2–4. A high-level block diagram of the first transceiver 104 is illustrated in FIG. 2. The first transceiver 104 includes a receiving circuit 200 and a transmitting circuit 202. The receiving circuit 200 includes an analog circuit 204 and a digital processing circuit 206. Both the receiving circuit 200 and the transmitting circuit 202 share a coupling circuit 210 which is connected to the wiring system via node 106, such as a household power outlet. The coupling circuit 210, therefore, can be selectively activated to provide an input signal to receiving circuit 200 or receive output data from transmitting circuit 202. The coupling circuit 210 provides two basic functions, the first is to provide an electrical connection between node 106 and the first transceiver circuit 104, and the second function is to isolate AC power which is present on wiring system 110.

Transmitting circuit 202 includes an encoder circuit 205, an amplifier circuit 207 and a band pass filter 209. The encoder circuit 205 receives input data, encodes the receive data, and generates voltage pulses representing the encoded data. That is, encoder circuit 205 changes the format of the input data to include error-correcting codes (ECCs). In one embodiment, an ECC is used to transmit 32-bit data packets including 26 bits of data. This format allows for error correction of one bit of data per packet. The encoder circuit 205 also includes a pulse generator circuit to generate two non-overlapping pulses with opposite polarities to represent a single bit of encoded digital data. If the digital data bit is a "1", a positive voltage pulse is first generated and followed by a negative voltage pulse. If the digital data bit is a "0", a negative voltage pulse is first generated and followed by a positive voltage pulse. These voltage pulses are amplified by amplifier circuit 207 for driving the analog data signal over the communications system 100. Band pass filter 209 is provided to suppress harmonic side lobes of the signal spectrum to reduce out-band interference to comply with current communication regulations.

The analog circuit 204 of receiving circuit 200 includes an attenuation circuit 212, amplifier circuit 214, band pass filter 216, received signal strength indicator (RSSI) circuit 218, multiplex circuit 220 and an analog to digital (A/D) circuit 222. The digital signal processing circuitry includes a demodulator circuit 230, signal detector circuit 232, equalizer circuit 234 and a decoder circuit 236. Starting with the analog circuit, attenuation circuit 212 adjusts the amplitude of a received signal such that the amplitude is below a predetermined level. The attenuation circuit 212 is adjusted during operation using a feedback circuit based upon the RSSI circuit 218. Amplifier circuit 214 is provided to amplify received signals which have an amplitude below a predetermined level. Band pass filter 216 provides a coarse filter operation to reduce noise which is outside of the communication frequency range. In one embodiment, band pass filter 216 has a pass band in the range of 3 to 20 MHZ. This pass band is smaller than the federally allowed communication range of 2 to 30 MHZ, such that some margin is provided. Multiplex circuit 220 is provided to couple either an output from band pass filter 216 or an output from RSSI circuit 218 to A/D circuit 222. In summary, the coupling circuit 210 extracts the analog input signal from the power line. The attenuation and amplifier circuits 212 and 214, respectively, pre-condition the input signal to a correct amplitude for further processing. The RSSI circuit 218 determines the original input signal level so that the communications system can set an appropriate attenuation level.

The A/D circuit 222 provides a digital representation of all signals received in the frequency range passed by band pass filter 216. This digital data includes both noise and the desired communication signals. Demodulator circuit 230 performs a fine filter operation to perform an out-band noise rejection operation. The demodulator circuit 230 also converts the signal for use by signal detector circuit 232. The demodulator circuit 230 comprises a transversal filter with the coefficients of the filter being the pulse shape of the transmitted signal. In one embodiment, the demodulator circuit 230 is a two tap transversal filter. The values of the two coefficients are one and minus 1. Thus, the digital signal transitions from a positive to a negative signal to indicate that the data signal received is a logic state 1. Similarly, the digital signal transitions from a negative to a positive signal to indicate that the data signal received is a logic state 0. The signal detector circuit 232 detects a signal arriving time, detects a phase of the signal, and normalizes the incoming signal for use by equalizer circuit 234. Equalizer 234 is a transversal filter with variable weights. The equalizer circuit 234 changes its filter weights recursively such that the weights converge to an optimal point. At the convergence point, the signal distortion caused by the uncertain power line channel characteristics is compensated and the digital information is recovered correctly, or with low bit error rate. The recovered digital data is then decoded, by decoder circuit 236, to complete the data reception operation.

One embodiment of both signal detector circuit 232 and equalizer circuit 234 are respectively described in greater detail with reference to FIGS. 3 and 4. Referring to FIG. 3, signal detector circuit 232 receives an input signal g(t) at input node 300. Circuit 302 is provided to generate an absolute value of g(t). The output signal from circuit 302 is provided to a first digital infinite impulse response filter (IIR) 304. The input signal provided on input node 300 is also coupled to first-in first-out (FIFO) buffer 312, as explained below. An output signal is provided on an output node 305 from first IIR filter 304, which has a monotonic increasing curve. The output provided on output node 305 provides an indication of the power provided on input node 300. That is, if the power on input node 300 is increasing, the signal on output node 305 is also increasing. Conversely, if the power on input node 300 is constant, the output signal from first IIR filter 304 is also constant.

A second IIR filter 306 is coupled to output node 305 of the first IIR filter 304. In this embodiment, two filters are provided in series to provide a smooth curve at a second output node 307, labeled x(t). It will be appreciated that those skilled in the art that a single filter could be used, but the quality of the output signal from the single filter may be compromised.

A first FIFO buffer 316 is coupled to second output node 307 to receive the output signal x(t). The output signal on second output node 307 is also coupled to a first comparator circuit 308, a second comparator circuit 310, and a slope calculator circuit 318. A maximum phase finder circuit 314 is coupled to receive the input signal g(t) provided on input node 300. Finally, a normalizer circuit 320 is coupled to receive an output signal 319 from the slope calculator circuit 318, a second FIFO buffer 312 and the maximum phase finder circuit 314.

First comparator circuit 308 compares signal x(t) to a threshold value c6 and provides an output signal indicating when x(t) exceeds the threshold value. In one embodiment, the threshold value is 2. Likewise, second comparator circuit 310 provides an output signal which indicates when x(t) exceeds its threshold value, c5. In one embodiment, the threshold value of second comparator circuit 310 is equal to 1.

Second comparator circuit 310 activates the maximum phase finder circuit 314 to monitor the maximum amplitude of the incoming signal, g(t). The maximum phase finder circuit 314 stops monitoring the incoming signal in response to first comparator circuit 308. The output signal from first comparator circuit 308 is also used to activate slope calculator circuit 318. The slope calculator circuit 318 is coupled to both an input connection and an output connection of the first FIFO buffer circuit 316. When activated, the slope calculator circuit 318 determines a slope between the signal at the input and output of the first FIFO buffer 316.

As explained above, second FIFO buffer 312 is coupled to input node 300 and buffers the input signal g(t). Second FIFO buffer 312 is longer than first FIFO buffer 316. The output of the slope calculator circuit 318 is used to tap second FIFO buffer 312. That is, when signal x(t) exceeds the threshold value of first comparator circuit 308, it is assumed that a data signal has arrived at input signal g(t). The output of slope calculator circuit 318, therefore, is used to indicate how much time has elapsed since the arrival of the data signal.

The output signal tapped from second FIFO buffer 312 is coupled to normalizer circuit 320. Normalizer circuit 320 performs a normalizing function on the output signal 313 from second FIFO buffer 312 based upon a maximum amplitude of the incoming signal as determined by maximum phase finder circuit 314. The normalizer circuit 320 also provides a decimation factor to the signal coming from second FIFO buffer 312. For example, the incoming signal g(t) can have a data rate of 60 mega-samples per second (MSPS). After normalization, data stream h(t) provided on output node 330 may be decimated to 15 MSPS according to the optimal phase determined by the maximum phase finder circuit 314.

Figure 4:
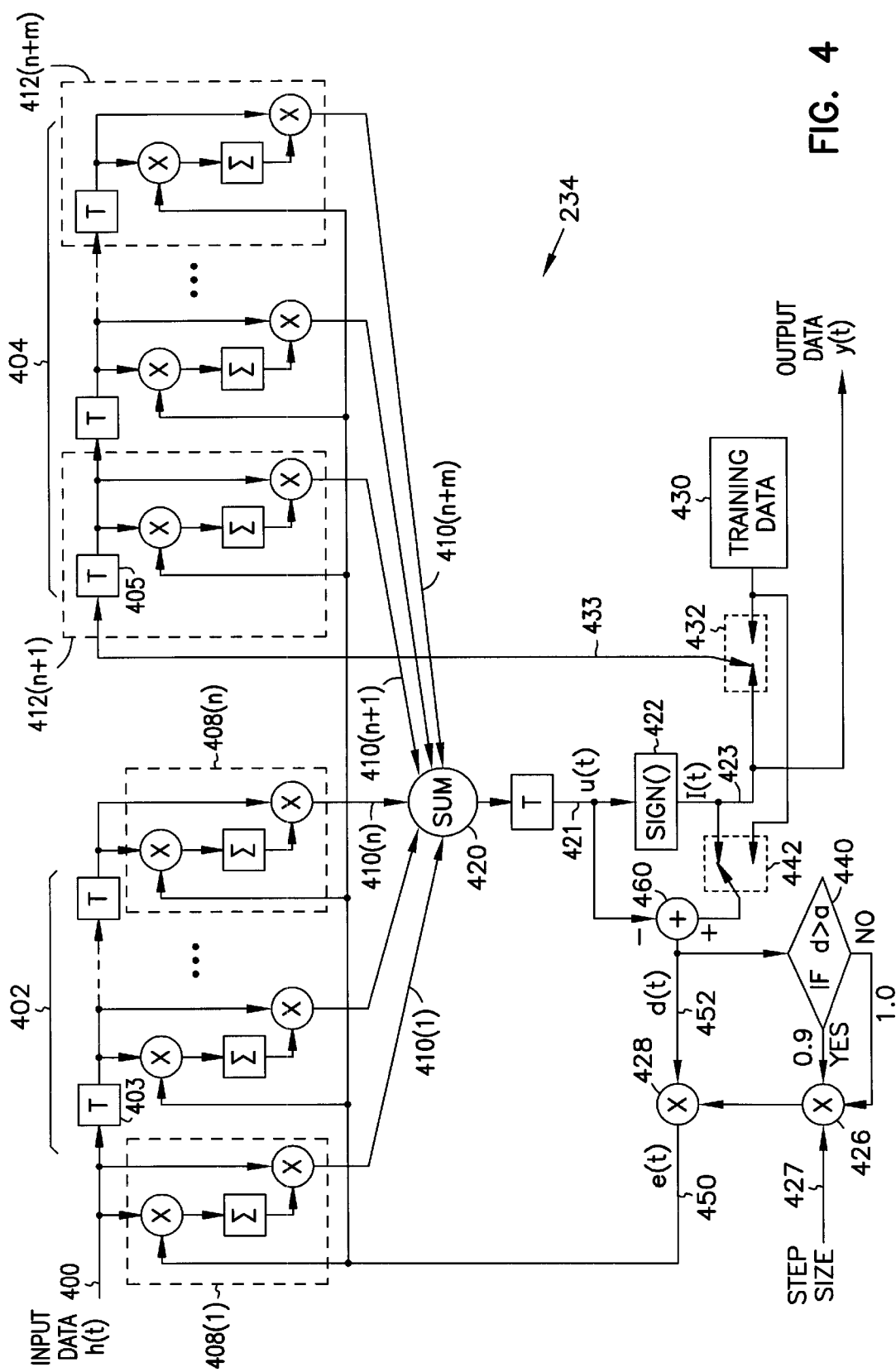
FIG. 4 is a diagram of an equalizer circuit transceiver of one embodiment of the present invention.

Data stream h(t) is coupled to an input node 400 of equalizer circuit 234, as illustrated in FIG. 4. The digital equalizer is basically a transversal filter with variable weights. After the signal detector circuit 232 triggers the equalizer circuit 234, the equalizer circuit 234 changes its filter weights recursively such that the weights converge to an optimal point. At the converged point, the signal distortion caused by uncertain power line channel characteristics is compensated and a digital information is recovered correctly, or with very low bit rate error.

Equalizer circuit 234 includes a feed-forward circuit 402, and a feed-back circuit 404. The feed-forward circuit includes a plurality of delay circuits 403 which are multiplied by a weight factor of weight circuits, or accumulator circuits 408(1)–(n) which have respective weight values, Wl–Wn. Each accumulator circuit 408(1)–(n) provides an output signal on nodes 410(1)–(n). Likewise, the feed-back circuit 404 accumulator circuits 412(n+1)–(n+m). Each accumulator circuit 412(n+1)–(n+m) has a respective weight value W(n+l)–W(n+m). In one embodiment, delay circuits 403 and 405 are each one step delays. In an embodiment with a 15 MSPS signal rate, each delay circuit 403 and 405 has a delay of approximately 66 ns in length. All of the output signals from both the feed-forward circuit 402 and the feed-back circuit 404 are coupled to a sum circuit 420.

A delayed output signal u(t) from sum circuit 420 is coupled to Sign( ) circuit 422. Sign( ) circuit 422 demodulates signal u(t) and provides an output binary data stream I(t). This output binary data stream I(t) is provided on node 423 as the output signal from the equalizer circuit 234. If signal u(t) is greater than zero, output binary data stream I(t) is +1. Conversely, if signal u(t) is less than zero, output binary data stream I(t) is –1. Thus, the output signal from equalizer circuit 234 is used to provide either a positive or a negative signal representing either a binary data 1 or a binary data 0. Thus, the digital signal transitions from a positive to a negative signal to indicate that the data signal received is a logic state 1. Similarly, the digital signal transitions from a negative to a positive signal to indicate that the data signal received is a logic state 0.

A switch circuit 432 is coupled to node 423, input node 433 of the feed-back circuit 404, and a training data circuit 430. In operation, switch circuit 432 couples the training data circuit 430 to the feed-back circuit 404 when a signal is detected by the signal detector circuit 232. That is, the training data circuit 430 is coupled to the feed-back circuit 404 when the signal detector taps second FIFO buffer 312. The training data comprises predetermined data used to train the weight values for the feed-forward circuit 402 and the feed-back circuit 404. When training is complete, switch circuit 432 couples the input node 433 of the feed-back circuit 404 to node 423 to receive output binary data stream I(t). In a similar manner, switch circuit 442 is provided to couple the training data to adder circuit 460. In one embodiment, the length of training is 600 bits. As such, switch circuit 432 couples output binary data stream I(t) to feed-back circuit 404 after 600 bits. Adder circuit 460 subtracts signal u(t) from a signal provided by switch circuit 442 (either output binary data stream I(t) or training data) to provide an output signal d(t) 452. Output signal d(t) 452 is multiplied at multiplier circuit 428 by a step size value, which is calculated as described below.

The output signal d(t) 452 is coupled to a comparator circuit 440. If output signal d(t) 452 is greater than the threshold value of the comparator circuit 440, a multiplier value for second multiplier circuit 426 is equal to 0.9, if output signal d(t) 452 is less than the threshold value of the comparator circuit 440 a multiplier value for second multiplier circuit 426 is equal to 1.0. Thus, a step size coefficient provided on the input node 427 is multiplied by either 0.9 or 1.0 and provided to first multiplier circuit 428. The comparator circuit 440, therefore, provides an auto step size control, which reduces the step size coefficient by 10 percent. It will be appreciated by those skilled in the art that the values multiplied by the step size coefficients can be adjusted and are not limited to 0.9 and 1.0. The step size coefficient value is predetermined and remains constant during training. After training is complete, a relaxing function is used to automatically decrease the step size coefficient on a periodic basis. For example in one embodiment, the step size coefficient is decreased every 200 iterations.

The output of first multiplier circuit 428 provides an error signal e(t) on node 450 which is coupled to both the feed-forward circuit 402 and the feed-back circuit 404.

As illustrated, the error signal e(t) is multiplied by signal h(t) of the feed-forward circuit 402, accumulated, and used to calculate the weight functions W1 to Wn. Likewise, the error signal e(t) is multiplied by the input signal of the feed-back circuit 404, accumulated, and used to calculate the weight functions Wn+1 to Wn+m.

CONCLUSION

The digital signal processor has been described which can operate in harsh wiring networks. The signal processor described uses an efficient signal detector which detects a signal arrival time. The signal detector can also select a phase of a detected signal and normalized an amplitude of the receive signal. A digital channel equalizer has been described which includes an auto step selection and a coefficient-relaxing scheme for reliable convergence in harsh wiring environments. The described signal processor uses a low analog to digital conversion rate to simplify digital implementation of modulation, pre-filtering, and equalization. Distinguished from prior approaches, the present digital signal processor does not require synchronization and timing recovery circuits. In one embodiment, the present invention has demonstrated communication at 15.625 Mbps through power lines in residential homes. This is compared to 100 to 350 Kbps power line modems presently available.

What is claimed is:

1. A receiver circuit comprising:
   an external coupling circuit for receiving an analog input signal;
   an amplifier circuit for amplifying the analog input signal;
   an analog filter having an input connection to receive the analog input signal which comprises a data signal and noise signals, the analog filter removes some out-of-band noise from the analog input signal and provides an analog output signal;
   an analog to digital circuit coupled to an output connection of the analog filter to convert the analog output signal to a digital signal;
   a signal detector coupled to the analog to digital circuit, the signal detector detects an arrival time of the data signal, and normalizes an output signal from the signal detector based upon a detected maximum amplitude; and
   an equalizer circuit comprising a recursive filter using variable weight functions which are controlled by a calculated error signal.

2. The receiver circuit of claim 1 further comprising an attenuation circuit coupled to the external coupling circuit, and a received signal strength indicator circuits coupled to the extra coupling circuit.

3. The receiver circuit of claim 1 wherein the signal detector comprises:
   a first-in first-out buffer circuit coupled to receive the digital signal;
   at least one filter circuit coupled to receive the digital signal, the at least one filter circuit provides an output signal which indicates a relative power level of the digital signal;
   an amplitude detector circuit to detect a maximum amplitude in the digital signal; and
   a normalizer circuit coupled to the first-in first-out buffer circuit and the amplitude detector circuit.

4. The receiver circuit of claim 3 wherein the amplitude detector circuit monitors the digital signal when an output signal from the at least one filter circuit is between first and second predetermined threshold levels.

5. The receiver circuit of claim 3 further comprising a slope calculator circuit which determines a signal slope of the output signal from the least one filter circuit.

6. The receiver circuit of claim 1 wherein the error signal is calculated using a weight step size which is automatically reduced at predetermined iterations of the equalizer circuit.

7. A transceiver circuit comprising:
   a receiver circuit comprising:
      an analog filter having an input connection to receive an analog input signal which comprises a data signal and noise signals, the analog filter removes some out-of-band noise from the analog input signal and provides an analog output signal,
      an analog to digital circuit coupled to an output connection of the analog filter to convert the analog output signal to a digital signal,
      a signal detector coupled to the analog to digital circuit, the signal detector detects an arrival time of the data signal, and normalizes an output signal from the signal detector based upon a detected maximum amplitude, and
      an equalizer circuit comprising a recursive filter using variable weight functions which are controlled by a calculated error signal; and
   a transmitter circuit comprising:
      a pulse generator circuit, and
      a spectral shaping filter.

8. The transceiver circuit of claim 7 further comprising a coupling circuit to electrically couple the receiver circuit and the transmitter circuit to an alternating current (AC) power line.

9. The transceiver circuit of claim 7 wherein the error signal is calculated using a weight step size which is automatically reduced at predetermined iterations of the equalizer circuit.

10. The transceiver circuit of claim 7 wherein the equalizer circuit comprises:
    a feed-forward circuit having a first series of delay circuits coupled to a first plurality of accumulator circuits;
    a feed-back circuit having a second series of delay circuits coupled to a second plurality of accumulator circuits, wherein the first and second plurality of accumulator circuits include a weight multiplier;
    an auto step size selection circuit which automatically adjusts the calculated error signal in response to a sum of output signals provided by the feed-forward circuit and the feed-back circuit; and
    a step size multiplier circuit coupled to the feed-forward and feed-back circuits for providing the calculated error signal.

11. The transceiver circuit of claim 10 wherein the step size multiplier circuit receives a step size coefficient which is automatically reduced at predetermined iterations of the equalizer circuit.

12. The transceiver circuit of claim 7 wherein the signal detector comprises:
    a first-in first-out buffer circuit coupled to receive the digital signal;
    at least one filter circuit coupled to receive the digital signal, the at least one filter circuit provides an output signal which indicates a relative power level of the digital signal;

an amplitude detector circuit to detect a maximum amplitude in the digital signal; and a normalizer circuit coupled to the first-in first-out buffer circuit and the amplitude detector circuit.

13. A method of detecting a data signal transmitted over a noisy wiring network, the method comprising:

receiving an analog signal comprising the data signal and noise signals;

performing a coarse filter operation to remove some noise signals;

converting the filtered analog signal to a digital signal;

detecting an arrival time of the data signal;

performing a normalizing operation on the digital signal to normalize the digital signal based upon a detected maximum amplitude; and equalizing the normalized digital signal to provide either a positive or negative output signal indicating a state of the data signal.

14. The method of claim 13 wherein the equalized digital signal transitions from a positive to a negative signal to indicate that the data signal received is a logic state 1, and wherein the equalized digital signal transitions from a negative to a positive signal to indicate that the data signal received is a logic state 0.

15. The method of claim 13 further comprising amplifying the received analog signal prior to performing the coarse filter operation.

16. The method of claim 13 further comprising detecting a phase of the digital signal prior to equalizing the digital signal to optimize performance of equalizing.

17. The method of claim 13 wherein equalizing the normalized digital signal is performed using a transversal filter having variable weights which are changed recursively to converge.

18. The method of claim 13 wherein equalizing the normalized digital signal is performed by an equalizer circuit including a step size coefficient provided on an input node, and the step size coefficient of the equalizer circuit is automatically decreased.

* * * * *

UNITED STATES PATENT AND TRADEMARK OFFICE
CERTIFICATE OF CORRECTION

PATENT NO. : 6,490,328 B1
DATED : December 3, 2002
INVENTOR(S) : Qiang Wu

It is certified that error appears in the above-identified patent and that said Letters Patent is hereby corrected as shown below:

Column 6,
Line 4, insert -- includes a plurality of delay circuits 405 and -- after "404".

Signed and Sealed this

Twenty-first Day of June, 2005

JON W. DUDAS
*Director of the United States Patent and Trademark Office*